Figure 1:
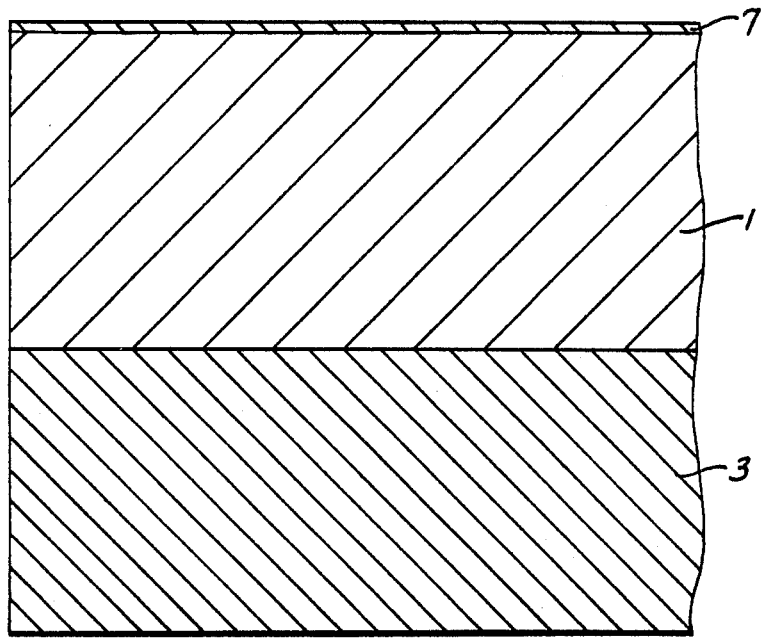

United States Patent [19]

Orstein et al.

[11] 4,050,906

[45] Sept. 27, 1977

[54] THERMOSTATIC METAL

[75] Inventors: Jacob L. Ornstein, Norton; Seth R. Thomas, Middleboro, both of Mass.

[73] Assignee: Texas Instruments Incorporated, Dallas, Tex.

[21] Appl. No.: 771,824

[22] Filed: Oct. 30, 1968

[51] Int. Cl. .................................................. B22b 15/00
[52] U.S. Cl. ..................................... 428/617; 428/931
[58] Field of Search ........................................ 29/195.5

[56] References Cited

U.S. PATENT DOCUMENTS

| | | | |
|---|---|---|---|
| 2,063,325 | 12/1936 | McLeod | 29/195.5 |
| 2,366,178 | 1/1945 | Chace | 29/195.5 |
| 2,482,900 | 9/1949 | Chace | 29/195.5 |
| 2,697,130 | 12/1954 | Korbelak | 29/195.5 |
| 3,219,423 | 11/1965 | Sears | 29/195.5 |
| 3,378,357 | 4/1968 | Alban | 29/195.5 |
| 3,454,373 | 7/1969 | Ornstein | 29/195.5 |

*Primary Examiner*—Hyland Bizot
*Attorney, Agent, or Firm*—Harold Levine; John A. Haug; James P. McAndrews

[57] ABSTRACT

The high-expansion layer of a metallic multilayer thermostatic material is composed of a high-resistance alloy, known as alloy P, which comprises approximately 72% manganese, 18% copper, and 10% nickel. This alloy is used when high flexivity is desired with high resistance in a bimetal or like thermostat. This layer, as an outside layer of the composite, is provided with a thin cladding of a material such as copper, nickel, a cupronickel alloy or the like, on its outside which is to be exposed when the alloy layer is combined in various combinations by solid-phase bonding with other comparatively low-expansion layers to form multilayer thermostats.

1 Claim, 2 Drawing Figures

THERMOSTATIC METAL

In the art of constructing multilayer thermostatic material, it is the practice to employ said alloy P as an outside layer in multilayer composites. However, in making such composites by solid-phase roll-bonding, the bonded material is subjected to a high-temperature annealing process at about 1400° F. or more. During this annealing step, the alloy P material oxidizes very rapidly, despite efforts to prevent such oxidation by the use of protective atmospheres or the like. As a result, tenacious oxide on the outside alloy P component of the composite must be mechanically cleaned as by abrading or the like, which is expensive and tends to cause some loss of control of evenness of layer thickness, resulting in an inferior product. Moreover, the alloy P material is subject to so-called high-stress corrosion, which is to say that in a stressed condition (as the material will be whenever used in a thermostatic metal part) it corrodes very rapidly at the location of highest stresses. This may occur at temperatures much lower than 1400° F. The protective coating contemplated by the present invention not only avoids the need for the cleaning after annealing, but also protects the thermostatic parts against such stress corrosion. The use of a thin nickel or copper protective layer on the alloy P layer also protects without reducing flexivity to any significant extent because of its thinness. Copper and nickel also provide good weldability for attaching parts to the composite. The color of the copper layer also serves to identify the high expansion side of the composite. Moreover these materials are capable of good adherence to the alloy P layer by solid-phase bonding and are quite formable. In the case of copper as a protective layer, it acts as a lubricant for the rolls of the bonding mill so as to increase the work output for a given starting thickness of layers to be rolled.

Referring to the drawings,

FIG. 1 diagrammatically illustrates one form of the invention; and

Figure 2:
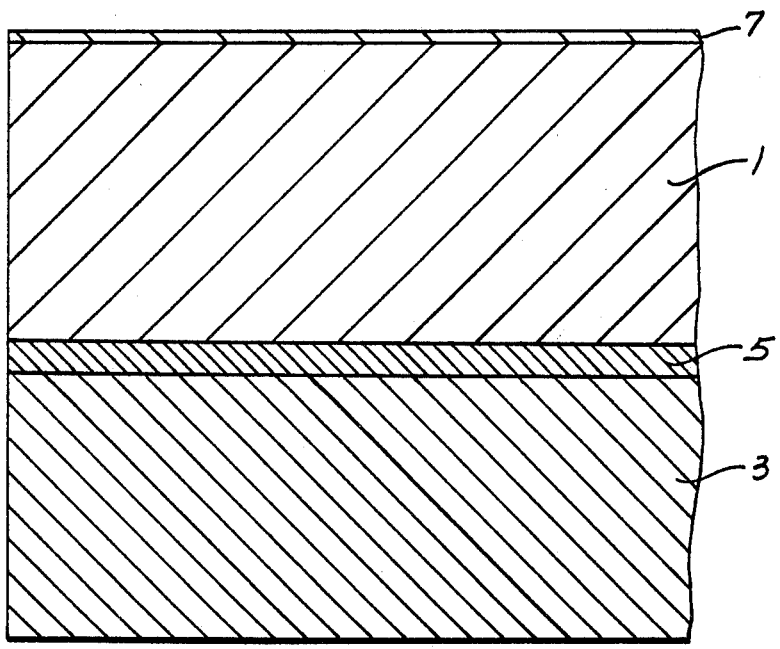

FIG. 2 diagrammatically illustrates another form.

Corresponding reference characters indicate corresponding parts throughout the two illustrations.

In the various forms of the invention, a layer 1 is employed consisting of a material having a comparatively high coefficient of expansion and a layer 3 consisting of a material of a comparatively low coefficient of expansion. A useful material for layer 1 is the alloy P, consisting of approximately 72% manganese, 18% copper, and 10% nickel. Such a layer, when combined with a layer 3 having the lower coefficient of expansion, produces in combination a multilayered material having a high flexivity. The alloy p also has a high electrical resistivity which is useful in determining the overall resistance of the composite. For example, it is useful when combined with a layer 3 composed of a so-called alloy "10" which consists substantially of 36% nickel and 64% iron; or it may be combined in a two-layer combination with a so-called alloy J. Alloy J is sometimes called silicon bronze, and consists substantially of 0.9 to 1.4% silicon, a maximum of 0.2% iron, 0.1 to 2.5% manganese, 0.05% lead maximum impurities 0.5% maximum, the balance copper. Layer 3 may also be composed of alloy "30" consisting of substantially 42% nickel, the balance iron. If two-layer arrangements do not produce a desired high conductivity, a third layer 5 may be employed, such as shown in FIG. 2, having a low resistance, which may be a material such as copper, nickel, or the so-called alloy F which is 99.65% copper, the balance silver. In all cases, the thicker that the alloy P layer 1 is, the higher will be the resistance of the composite of which it is a component. In designing a particular thermostatic material, the desired flexivity and resistivity must be taken into account. In general, the total thickness of the thermostatic material is on the order of 0.003 to 0.125 inch. The ratio of the thickness of the alloy P layer 1 may range from a high value such as 80% down to 10% or so of the total thickness of the composite, depending upon how much or little resistance is demanded in the composite.

The alloy P material is solid-phase bonded with the other layer 3 or other layers 3 and 5 by single- or multiple-pass rolling with reduction to form solid-phase green bonds, followed by sintering or annealing at a comparatively high temperature, such as 1400° F. or so, which improves the green bonds. Under this high sintering or annealing temperature, the alloy P, as above stated, oxidizes very rapidly despite efforts to prevent it with the undesirable results above noted. Since the alloy P layer would in all forms of the invention be outside with one face exposed, the difficulty is encountered in both two-layer, three-layer and other combinations.

It has been proposed to copper-plate composited to protect the exposed surface of a layer such as the alloy P layer 1. This involves difficulties because parts become plated on all sides in the copper-plating bath unless stop-off materials are used, as for example on the exposed side of layers such as 3. This not only wastes plating material but decreases flexivity. Another disadvantages is that both sides of the product look the same, so that high-expansion side cannot be readily identified. Moreover, electroplating has low strength, is not very formable, and has low adherence to the surface upon which it is plated.

According to our invention, for any combination of roll-bonded strips such as 1,3 or 1,3,5, a thin strip 7 is roll-bonded on the exposed surface of the alloy P layer 1. Bonding occurs in the solid phase in response to reduction in the overall thickness. Thus solid-phase green bonding is initially brought about between the interfaces between all layers in the composite. Then, the green-bonded multilayered strip is sintered or annealed at the stated temperature of 1400° F. or more, thereby improving the strength of the green bonds. This leaves the composite in every case with a thin protective layer 7 strongly solid-phase bonded to the high-expansion alloy P layer 1, the latter having high resistance and producing high flexivity. Individual thicknesses of layers such as 1,3,5 are variable, being determined by the amount of resistance required, which may range from 30 to 600 ohms per circular mil. - foot. The thickness of the protective layer 7 is in the range of from 1 to 15% of the total thickness of the composite with 1 to 5% preferred. The thickness of the layer 7 should not be increased without limit because this may undesirably decrease both the flexivity of the composite and its resistance. Cupro-nickel when used as cladding 7 may have ratios ranging from 90:10 to 75:25 for copper to nickel.

We have found it satisfactory to employ a copper or nickel layer 7 of less than 0.0007 inch thickness on a composite such as above described having an overall thickness of .015 inch. This or like small amounts of copper or nickel have little effect on the flexivity and resistivity of the composite. Any cleaning that may be required of the exposed face of the copper or nickel protective layer can be accomplished without damage to the composite, as by the normal comparatively gentle pickling or scrubbing operations, rather than the rougher damaging abrading operations such as were heretofore required to clean the alloy P type.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A multilayer composite thermostatic metal material comprising a first metal layer composed of an alloy consisting of approximately 72% manganese, 18% copper and 10% nickel, a second layer of metal selected from the group consisting of an alloy composed of approximately 36% nickel and 64% iron, an alloy composed of approximately 42% nickel and the balance iron, and an alloy composed of from 0.9 to 1.4% silicon, a maximum of 0.2% iron, from 0.1 to 2.5% manganese, a maximum of 0.05% lead, a maximum of 0.5% impurities, and the balance copper, a third layer of metal of relatively higher electrical conductivity than said metals of said first and second layers, said first and second metal layers being metallurgically bonded in the solid-phase to opposite sides of said third metal layer and having relatively high and low coefficients of thermal expansion respectively for cooperating with said third metal layer in substantially determining the electrical conductivity and flexivity characteristics of said thermostatic material, and an additional layer of metal selected from the group consisting of copper, nickel and cupronickle alloys having one face thereof metallurgically bonded in the solid-phase to one face of said first metal layer oppositely of said third metal layer protecting said first metal layer from oxidation and corrosion.

* * * * *